United States Patent
Vandanapu et al.

(10) Patent No.: US 10,088,327 B2
(45) Date of Patent: Oct. 2, 2018

(54) NAVIGATION SYSTEM WITH COMMUNICATION MECHANISM AND METHOD OF OPERATION THEREOF

(71) Applicant: Telenav, Inc., Sunnyvale, CA (US)

(72) Inventors: Naveen Kumar Vandanapu, Sunnyvale, CA (US); Gregory Stewart Aist, San Mateo, CA (US); Casey Carter, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/954,389

(22) Filed: Nov. 30, 2015

(65) Prior Publication Data

US 2017/0153115 A1 Jun. 1, 2017

(51) Int. Cl.
*G01C 21/36* (2006.01)

(52) U.S. Cl.
CPC ....... *G01C 21/362* (2013.01); *G01C 21/3605* (2013.01)

(58) Field of Classification Search
CPC G01C 21/3492; G01C 21/34; G01C 21/3415; G01C 21/3691; G01C 21/00; G01C 21/26; G01C 21/3407; G01C 21/3469; G01C 21/3476; G01C 21/36; G01C 21/362; G01C 21/3655; G01C 21/3694
USPC ................ 701/400, 414, 424, 532, 533, 537
See application file for complete search history.

(56) References Cited

U.S. PATENT DOCUMENTS

| | | | | |
|---|---|---|---|---|
| 7,711,475 B1* | 5/2010 | Cona | ................ | G01C 21/3415 701/415 |
| 8,000,893 B1* | 8/2011 | Cona | ................ | G01C 21/3415 701/414 |
| 8,374,791 B2 | 2/2013 | Holsinger | | |
| 8,478,307 B1 | 7/2013 | Hayes | | |
| 8,510,032 B2 | 8/2013 | Shen et al. | | |
| 2005/0096839 A1* | 5/2005 | Nakano | ............. | G01C 21/3694 701/532 |
| 2010/0098230 A1* | 4/2010 | Bhow | ................ | H04L 12/1818 379/202.01 |
| 2013/0013192 A1* | 1/2013 | Yakali | ............... | G01C 21/3407 701/424 |
| 2013/0151149 A1* | 6/2013 | Kristinsson | ........ | G06Q 10/1095 701/533 |
| 2013/0289876 A1* | 10/2013 | Gutman | ............. | G01C 21/3469 701/537 |
| 2014/0170973 A1* | 6/2014 | Sugawara | ........... | H04L 67/1095 455/41.1 |
| 2014/0188390 A1* | 7/2014 | Tuukkanen | ........ | G01C 21/3492 701/533 |
| 2015/0153195 A1* | 6/2015 | Burlingham | ....... | G06Q 30/0259 701/123 |

(Continued)

*Primary Examiner* — Anne M Antonucci
*Assistant Examiner* — Sanjeev Malhotra
(74) *Attorney, Agent, or Firm* — Perspectives Law Group, Corp.

(57) ABSTRACT

A method of operation of a navigation system includes: identifying a free-travel mode for representing a user travelling without a calculated navigation route or an expressed destination determining a contextual parameter during the free-travel mode; and determining a target access identification with a control circuit for communicating with a communication target during the free-travel mode.

17 Claims, 6 Drawing Sheets

(56) References Cited

U.S. PATENT DOCUMENTS

2015/0226569 A1* 8/2015 Schuurbiers ....... G01C 21/3492
 701/400
2015/0260536 A1* 9/2015 Tuukkanen ........ G01C 21/3492
 701/414

* cited by examiner ized that any reference to "an embodiment," "one embodiment," or similar language does not preclude the existence of additional embodiments or alternative configurations of the present invention.

NAVIGATION SYSTEM WITH COMMUNICATION MECHANISM AND METHOD OF OPERATION THEREOF

TECHNICAL FIELD

An embodiment of the present invention relates generally to a navigation system, and more particularly to a system with a communication mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is balancing accessibility with safety in using the various devices. The possible applications for balancing accessibility with safety have not yet been fully utilized.

Thus, a need still remains for a navigation system with a communication mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: identifying a free-travel mode for representing a user travelling without a navigation route or an expressed destination; determining a contextual parameter during the free-travel mode; and determining a target access identification with a control circuit for communicating with a communication target during the free-travel mode.

An embodiment of the present invention provides a navigation system, including: a control circuit configured to: identify a free-travel mode for representing a user travelling without a navigation route or an expressed destination; determine a contextual parameter during the free-travel mode; determine a target access identification for communicating with a communication target during the free-travel mode; and a communication circuit, coupled to the control circuit, for processing the target access identification for communicating with the communication target.

An embodiment of the present invention provides a non-transitory computer readable medium including instructions for a navigation system, including: identifying a free-travel mode for representing a user travelling without a navigation route or an expressed destination; determining a contextual parameter during the free-travel mode; and determining a target access identification for communicating with a communication target during the free-travel mode.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
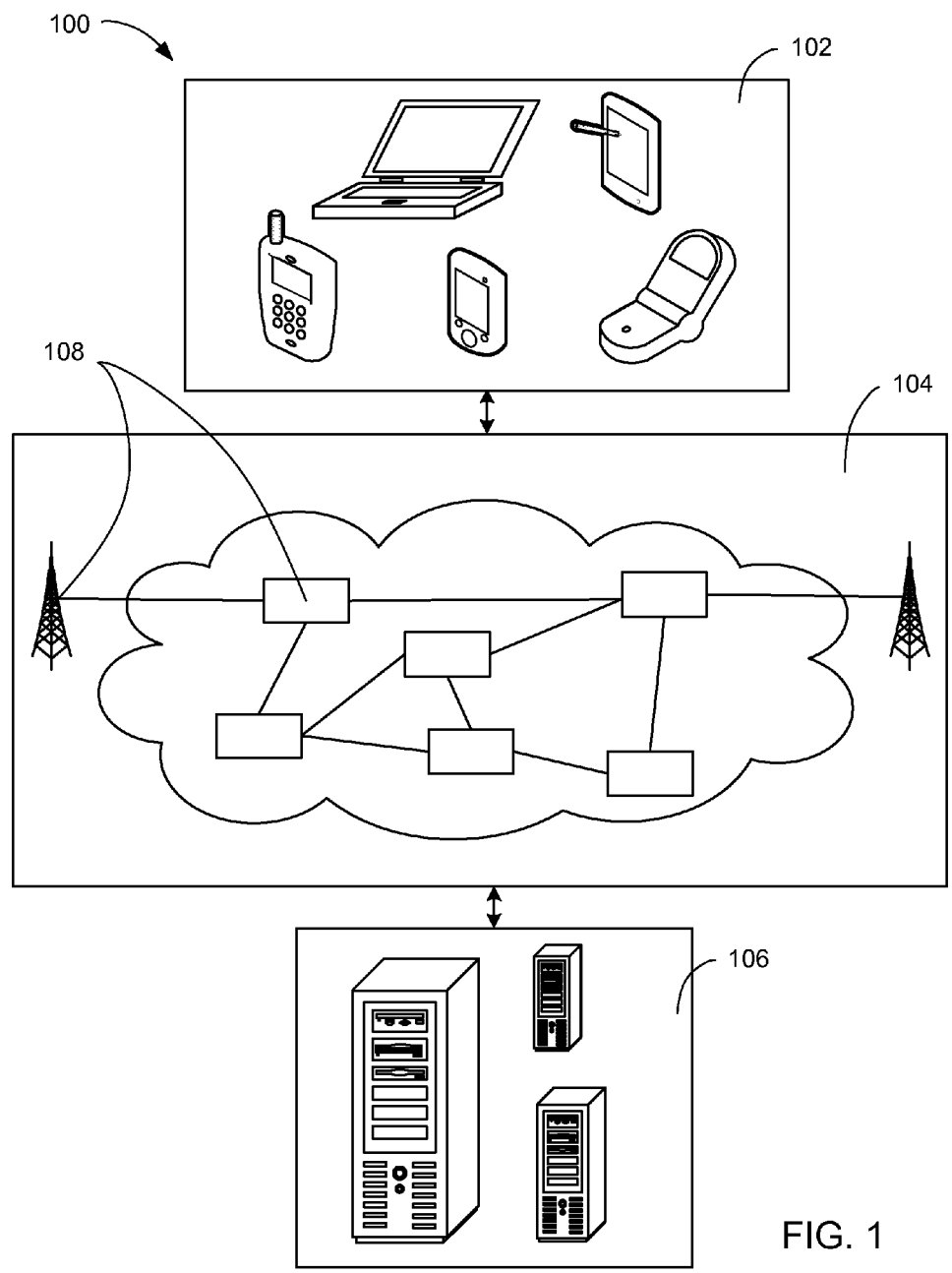
FIG. 1 is a navigation system with a communication mechanism in an embodiment of the present invention.

The following embodiments can be for determining a communication target, a target access identification associated thereto, or a combination thereof based on contextual parameters. The communication target, the target access identification, or a combination thereof can be determined without user-entry specifying the communication target, the target access identification, a portion thereof, or a combination thereof. The contextual parameters can be used to predict or estimate intent or desire of the user accessing functionalities during a travel session of a free-travel mode.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a navigation system 100 with a communication mechanism in an embodiment of the present invention. The navigation system 100, including a navigation system for searching or providing guidance or information associated with geographic locations, can include a first device 102, such as a client or a server, connected to a second device 106, such as a client or server. The first device 102 can communicate with the second device 106 with a network 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the network 104 to communicate with the second device 106 or can be a stand-alone device. The first device 102 can further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Figure 2:
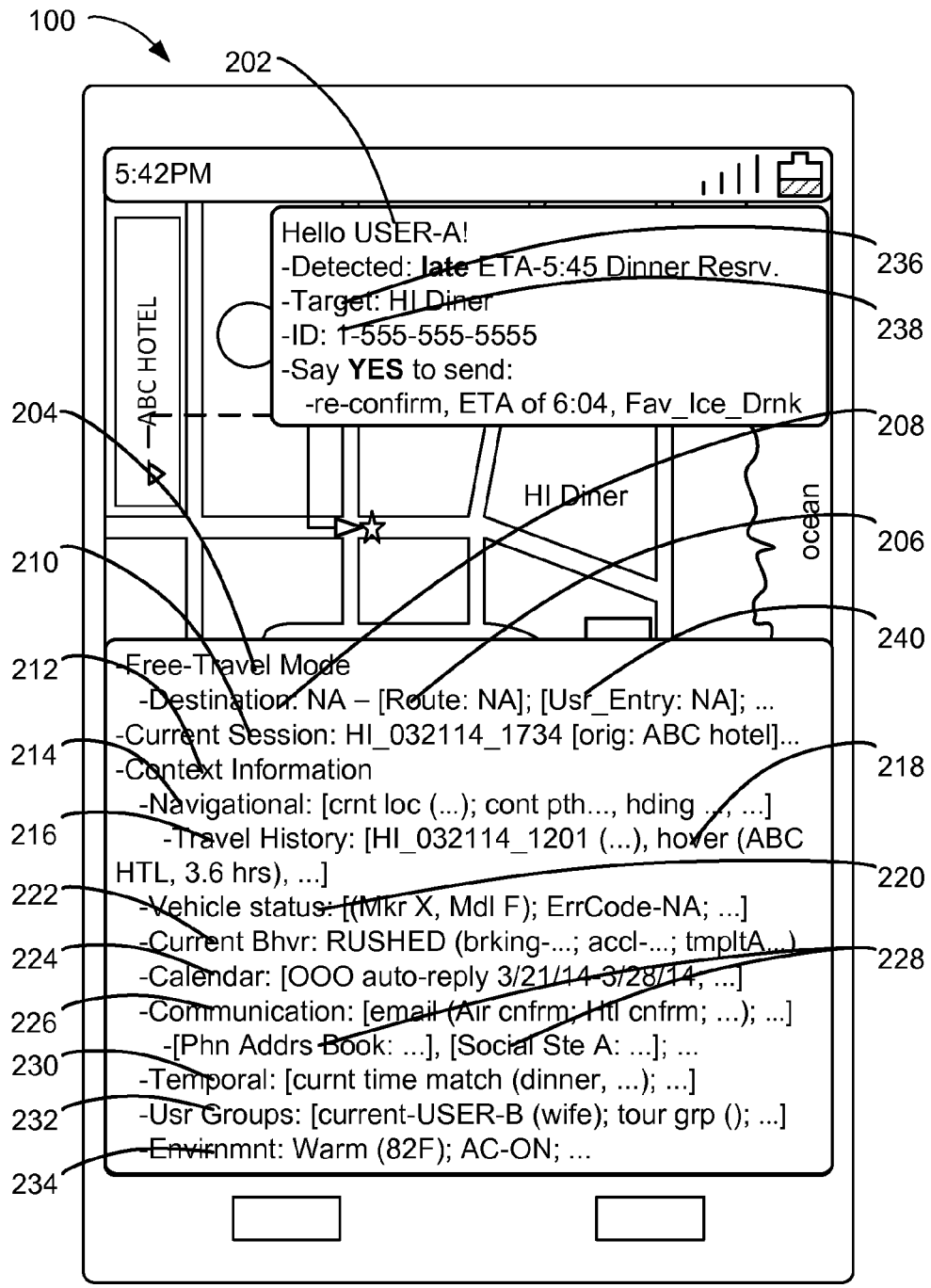
FIG. 2 is an example of a display interface of the navigation system.

Referring now to FIG. 2, therein is shown an example of a display interface of the navigation system 100. The navigation system 100 can show a user 202 utilizing a free-travel mode 204. The user 202 can include a person or an entity utilizing the navigation system 100 or a device therein, such as the first device 102 of FIG. 1, the second device 106 of FIG. 1, or a combination thereof.

The free-travel mode 204 is a representation of the user 202 traveling without guidance from the navigation system 100. The free-travel mode 204 can be based on the user 202 travelling without a calculated navigation route 206 from the navigation system 100.

The calculated navigation route 206 can include a path leading to a destination. The calculated navigation route 206 can include a segment, a node, or a combination thereof representing physical paths. The calculated navigation route 206 can represent a particular path calculated by the navigation system 100 for guiding the user to the destination.

The free-travel mode 204 can further be based on the user 202 traveling without an expressed destination 208. The expressed destination 208 is a desired or targeted geographical location associated with movement or travel or the user 202 as provided or identified by the user 202. For guidance sessions independent of the free-travel mode 204, the user 202 can provide the expressed destination 208 to the navigation system 100. The navigation system 100 can calculate the calculated navigation route 206 for guiding the user 202 to the expressed destination 208.

For the free-travel mode 204, the user 202 can travel without guidance from the navigation system 100, such as when the user 202 knows a path or a route to, neighborhood or area surrounding, or a combination thereof relative to a destination desired or intended by the user 202. The navigation system 100 can be without the expressed destination 208, without the expressed destination 208, or a combination thereof for the free-travel mode 204.

The navigation system 100 can determine a travel session 210 for the free-travel mode 204. The travel session 210 is a representation of a continuous travel to a perceived or estimated destination. The travel session 210 can include stops, transfers, change in travel means or vehicles, or a combination thereof in traveling to the destination intended by the user 202 during the travel session 210.

The navigation system 100 can determine the travel session 210 by identifying demarcations for a start or departure, an end or arrival, or a combination thereof for the free-travel mode 204. The navigation system 100 can further determine the travel session 210 including waypoints, stopovers, intermediate or temporary deviations, or a combination thereof. The navigation system 100 can ignore the waypoints, the stopovers, the intermediate or temporary deviations, or a combination thereof as separate demarcations for the travel session 210 and include in the overall instance of the travel session 210.

For example, the navigation system 100 can determine the travel session 210 of the current instance of the free-travel mode 204 as the user 202 driving home from a dinner appointment as illustrated in FIG. 2. The navigation system 100 can determine the travel session 210 as from the dinner appointment to the home of the user 202 separate from travel from place of work for the user 202 to the dinner appointment. The navigation system 100 can further determine the travel session 210 to include a stop at a gas station or a grocery store in overall continuous travel to the home of the user 202.

The navigation system 100 can process one or more contextual parameters 212 during the free-travel mode 204 to assist the user 202. The contextual parameters 212 can include data or information associated with or relevant to the free-travel mode 204.

The contextual parameters 212 can include determinable aspect of a current circumstance or situation. The contextual parameters 212 can include data or information representing an aspect of a current circumstance or situation of the user 202 during the free-travel mode 204. The contextual parameters 212 can further include or be associated with determinable aspect of a circumstance or situation occurring in the past during a prior instance of the travel session 210 for the free-travel mode 204.

For example, the contextual parameters 212 can include content, value, metadata, preference, setting, configuration, a portion thereof, a representation thereof, or a combination thereof. Also for example, the contextual parameters 212 can include data or information associated with movement or travel of the user 202, schedule or calendar of the user 202, communications of the user 202, current time, groups or relationships of the user 202, current environment, or a combination thereof.

As a more specific example, the contextual parameters 212 can be associated with a navigational context 214. The navigational context 214 is an abstract categorization for a set of facts or circumstances that are associated with geographical displacement of the user 202.

Continuing with the example, the navigational context 214 can be a label or a value representing a purpose, a goal, a meaning, a significance, a category, an affinity, or a combination thereof associated with the travel or movement of the user 202. The contextual parameters 212 for the navigational context 214 can include a current location, a previous location, a last maneuver, a speed or a velocity, a heading, an acceleration, other relevant information, a time associated thereto, a profile thereof, or a combination thereof.

The navigational context 214 can be associated with a travel history 216. The travel history 216 can be a record of previous travels, movements, visited locations, travelled routes, or a combination thereof. The travel history 216 can further include a time or a duration associated with the previous travels, movements, visited locations, travelled routes, or a combination thereof. The travel history 216 can further include a pattern therein for the previous travels, movements, visited locations, travelled routes, or a combination thereof as determined by the navigation system 100.

The navigational context 214, the travel history 216, or a combination thereof can be associated with one or more instances of hover location 218. The hover location 218 is a representation of a geographic area, a location, an entity, or a combination thereof utilized or occupied by the user 202. The hover location 218 can represent of the geographic area, the location, the entity, or the combination thereof where the user 202 was a patron, a consumer, a purposeful visitor, a guest, an inhabitant, or a combination thereof instead of where the user 202 was a transient, was passing through, was briefly pausing the travel, or a combination thereof.

The hover location 218 can be represent of the geographic area, the location, the entity, or the combination thereof not identified or provided as the expressed destination 208 by the user 202 at the time of travel or visitation. The hover location 218 can represent the geographic area, the location, the entity, or the combination thereof corresponding to previous instances of the free-travel mode 204.

The hover location 218 can be determined by the navigation system 100 based on map information, previous location or corresponding coordinates, time or duration at the previous location, or a combination thereof included in the travel history 216. The navigational context 214 can include or be based on the hover location 218. Details regarding the hover location 218 are discussed below.

The navigational context 214, the travel history 216, or a combination thereof can be further based on vehicle status 220, current behavior 222, or a combination thereof. The vehicle status 220 can include a state or a condition of a vehicle utilized or occupied by the user 202 for the free-travel mode 204. The vehicle status 220 can include information or data regarding operation or functionality of the vehicle, such as speed, acceleration, fuel reading, health or self-test reading, an error or failure report, utilized accessories or devices within the vehicle, or a combination thereof.

The current behavior 222 can include a representation or a categorization of a conduct or a performance associated with operating or maneuvering the vehicle during travel session 210 of the free-travel mode 204. The current behavior 222 can represent a hurried behavior as represented by acceleration magnitude or change in acceleration.

Also as a more specific example, the contextual parameters 212 can be associated with a calendar context 224. The calendar context 224 can include an abstract categorization for a set of facts or circumstances that are associated with schedule related information of the user 202. The calendar context 224 can be a label or a value representing a meeting, an appointment, an event, a note, a reminder, a record, or a combination thereof associated with the user 202.

Continuing with the example, the calendar context 224 can further include a purpose, a goal, a meaning, a significance, a category, an affinity, or a combination thereof associated with the travel or movement of the user 202. The contextual parameters 212 for the calendar context 224 can include a record of previous, current, upcoming, or a combination of instances thereof for the meeting, the appointment, the event, the note, the reminder, the record, a time or duration associated thereto, a location associated thereto, or a combination thereof.

Also as a more specific example, the contextual parameters 212 can be associated with a communication context 226. The communication context 226 can include an abstract categorization for a set of facts or circumstances that are associated with communications of the user 202.

Continuing with the example, the communication context 226 can be a label or a value representing a purpose, a goal, a meaning, a significance, a category, an affinity, or a combination thereof associated with the communications of the user 202. The contextual parameters 212 for the communication context 226 can include a corresponding party for the communication, a time or duration of the communication, content of the communication, a location associated thereto, a history or a sequence thereof, or a combination thereof.

Continuing with the example, the communication context 226 can further be associated with a contact set 228 of the user 202. The contact set 228 can include identification or access information configured or stored by the user 202. The contact set 228 can include an address book, a saved contact list, a list of connections or contacts, previous communicating parties, or a combination thereof.

Also as a more specific example, the contextual parameters 212 can be associated with a temporal context 230. The temporal context 230 can include an abstract categorization for a set of facts or circumstances that are associated with a time or a temporal aspect for the travel session 210 of the free-travel mode 204.

Continuing with the example, the temporal context 230 can be a label or a value representing a meaning, a significance, a category, an influence, or a combination thereof associated with the time or the temporal aspect for the travel session 210, previous or current. The contextual parameters 212 for the temporal context 230 can include a current time or a previous time of the travel session 210, a duration with the travel session 210, a season, a time of day, or a combination thereof.

As a further specific example, the temporal context 230 can be a comparison or an identification of the current time or the previous time in comparison to a season, a school schedule, traffic time, meal time, work or professional schedule, weekday or weekend, a holiday, or a combination thereof. Also as a further specific example, the temporal context 230 can be related to the calendar context 224 or an entry represented therein.

Also as a more specific example, the contextual parameters 212 can be associated with a user-grouping context 232. The user-grouping context 232 can include an abstract categorization for a set of facts or circumstances that are associated with connection between the user 202 and another person, group, entity, or a combination thereof.

Continuing with the example, the user-grouping context 232 can represent a social relationship between the user 202 and other people. The user-grouping context 232 can be a label or a value representing a grouping of people, entity, or a combination thereof including the user 202, a purpose, a goal, a meaning, a significance, a category, a degree or familiarity level, or a combination thereof associated with the grouping, such as family, friends, business acquaintances, activity group, coworkers, project group, classmates, or a combination thereof.

The contextual parameters 212 for the user-grouping context 232 can include communication history, common information in user identification or profile data, such as for school or place of employment, social network connection, such as included in social networking sites, user-provided information, common concurrent locations of users, shared data, or a combination thereof. The contextual parameters 212 for the user-grouping context 232 can further include patterns representing group behaviors for multiple users or entities, such as common times, common activities, shared tasks or movements, common location, or a combination thereof.

Also as a more specific example, the contextual parameters 212 can be associated with an environmental context 234. The environmental context 234 is an abstract categorization for a set of facts or circumstances that are associated with physical surroundings of the user 202. The contextual parameters 212 for the environmental context 234 can include weather forecasts, weather indicators, physical conditions or delays associated with roads or travel means, signal strength, noise level, number of co-occupants or passengers, visibility, or a combination thereof.

The navigation system 100 can use the contextual parameters 212 to estimate or predict a communication target 236 for communication during or concurrent with the free-travel mode 204. The communication target 236 can include a person or an entity the user 202 may desire as a counterpart for communication. The navigation system 100 can estimate or predict the communication target 236 to estimate or predict the person, the entity, or a combination thereof the user 202 may desire as a counterpart for the communication.

The navigation system 100 can estimate or predict the communication target 236 for various forms of communication, such as phone call, text or media message, email, posting or submission to a site, or a combination thereof. The communication target 236 can include a call recipient, a message receiver or recipient, an email recipient, a server or a service site, or a combination thereof.

The navigation system 100 can further determine a target access identification 238 corresponding to the communication target 236. The target access identification 238 can include a description or a representation of the communication target 236. The target access identification 238 can include a name, a number, a title, a screen name, an address, or a combination thereof for communicating with the communication target 236. The target access identification 238 can further include a search zone or boundary.

The communication target 236 can include multiple instances of the target access identification 238 corresponding thereto. The navigation system 100 can select one or more instances of the target access identification 238 appropriate for communication during the free-travel mode 204. The navigation system 100 can determine the target access identification 238 based on various factors, such as settings or configurations of the user 202 or the communication target 236, the contextual parameters 212, context for the communication target 236, limitations, or a combination thereof.

The navigation system 100 can determine the target access identification 238 without user-entry 240 matching the target access identification 238 or a portion thereof. The user-entry 240 can include information provided by the user 202. The user-entry 240 can include a letter, a number, audible sound, a motion, or a combination thereof. The navigation system 100 can determine the target access identification 238 automatically, without the user-entry 240 from the user 202 for inputting or providing the target access identification 238 to the navigation system 100.

Figure 3:
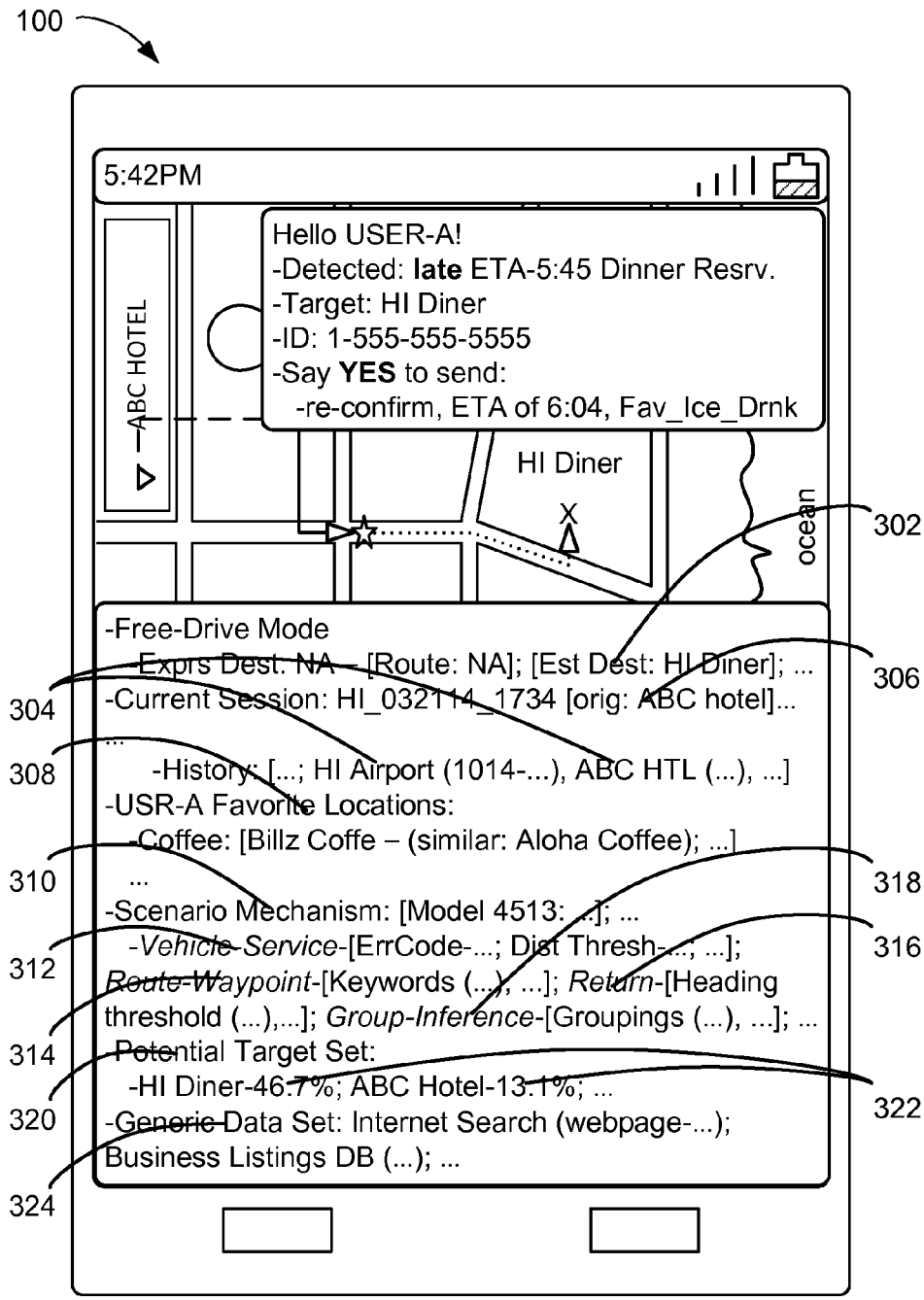
FIG. 3 is a further example of the display interface of the navigation system.

Referring now to FIG. 3, therein is shown a further example of the display interface of the navigation system 100. The navigation system 100 can generate an estimated destination 302 for the travel session 210 of FIG. 2 of the free-travel mode 204 of FIG. 2 for determining the target access identification 238 of FIG. 2, the communication target 236 of FIG. 2, or a combination thereof.

The estimated destination 302 is a geographic location predicted to be the destination sought by the user 202 of FIG. 2 during the free-travel mode 204. The estimated destination 302 can be generated by the navigation system 100 based on the contextual parameters 212 of FIG. 2 to estimate the location the user 202 is intending to arrive at the end of the travel session 210 of the free-travel mode 204. The estimated destination 302 can represent an estimate of a purpose or a goal of the user 202 for the free-travel mode 204.

The navigation system 100 can determine the communication target 236, the target access identification 238, or a combination thereof based on a preceding destination 304, an origination point 306, or a combination thereof. The preceding destination 304 can include a destination, estimated by the navigation system 100 or provided by the user 202, where the user 202 occupied at a previous time.

The preceding destination 304 can include the expressed destination 208 of FIG. 2 associated with the calculated navigation route 206 of FIG. 2 previously used and traveled by the user 202. The preceding destination 304 can further include the estimated location 302 for a prior instance of the travel session 210 of the free-travel mode 204.

The origination point 306 can include a starting location for travels or physical displacements of the user 202 for a single instance of the travel session 210. The origination point 306 can include a geographic location marking a start or a beginning of the travel session 210. The origination point 306 can correspond to a prior or a current instance of the travel session 210. The navigation system 100 can determine the origination point 306 based on the contextual parameters 212.

The navigation system 100 can further determine the communication target 236, the target access identification 238, or a combination thereof based on a specific location set 308, a scenario mechanism 310, or a combination thereof. The specific location set 308 can include geographic locations or areas related to the user 202.

The specific location set 308 can include frequently visited locations or areas, locations or areas related to a role or a responsibility of the user 202, locations or areas having significance to or affinity of the user 202, locations or areas having efficiency associated with the user 202, or a combination thereof. The navigation system 100 can generate the specific location set 308 based on the contextual parameters 212.

The scenario mechanism 310 is a method or a process for recognizing a goal or an objective from a set of factors. The scenario mechanism 310 can include a template, a threshold, a range, or a combination thereof for the set of factors for recognizing various goals or objectives. The navigation system 100 can use the scenario mechanism 310 to process the contextual parameters 212 in estimating or recognizing the goal, the objective, the intent, or a combination thereof for the user 202.

The navigation system 100 can use the scenario mechanism 310 to estimate or recognize the goal, the objective, the intent, or a combination thereof associated with the travel session 210 of the free-travel mode 204. For example, the scenario mechanism 310 can include a vehicle-service scenario 312, a route-waypoint scenario 314, a return scenario 316, a group-inference scenario 318, or a combination thereof.

The vehicle-service scenario 312 is a template, a threshold, a range, or a combination thereof for the set of factors for recognizing the intent or the goal of the user 202 to service the vehicle at the end of the travel session 210. The vehicle-service scenario 312 can include a pattern for the contextual parameters 212 indicative of the user 202 traveling to a location for servicing vehicles.

For example, the vehicle-service scenario 312 can include a threshold or a range for the vehicle status 220 of FIG. 2, the current behavior 222 of FIG. 2, or a combination thereof. Also for example, the vehicle-service scenario 312 can further include a template, a threshold, a range, or a combination thereof for the contextual parameters 212 for the navigational context 214 of FIG. 2, such as current heading or traveled path, the calendar context 224 of FIG. 2 or the communication context 226 of FIG. 2, such as for appointments, the temporal context 230 of FIG. 2 or the environmental context 234 of FIG. 2, such as for business hours and seasonal patterns, the travel history 216 of FIG. 2, or a combination thereof associated with the location for servicing vehicles.

The route-waypoint scenario 314 is a template, a threshold, a range, or a combination thereof for the set of factors for recognizing an intermediate intent or goal of the user 202 associated traveling to the estimated destination 302. The route-waypoint scenario 314 can be based on estimated stops or deviations while ultimately traveling to the estimated destination 302. For example, the route-waypoint scenario 314 can include a pattern for the contextual parameters 212 indicative of the user 202 wanting to buy items for use or consumptions at the estimated destination 302 or refuel on the way to the estimated destination 302.

For example, the route-waypoint scenario 314 can include a template, a threshold, a range, or a combination thereof for the current behavior 222, the travel history 216, the vehicle status 220, the contextual parameters 212 for the navigational context 214, or a combination thereof. Also for example, the route-waypoint scenario 314 can further include a template, a threshold, a range, or a combination thereof for the contextual parameters 212 for the calendar context 224 or the communication context 226, such as for reminders or recent communications, the temporal context 230, or a combination thereof associated with potential needs or stops along the way to the estimated destination 302.

The return scenario 316 is a template, a threshold, a range, or a combination thereof for the set of factors for recognizing the intent or the goal of the user 202 to potentially return to the origination point 306, the preceding destination 304, or a combination thereof. The return scenario 316 can include a pattern for the contextual parameters 212 indicative of the user 202 potentially returning to the origination point 306, the preceding destination 304, or a combination thereof.

For example, the return scenario 316 can include a template, a threshold, a range, or a combination thereof for the contextual parameters 212 for the navigational context 214, the temporal context 230, or a combination thereof. As a more specific example, the return scenario 316 can be for recognizing when the user 202 may have unintentionally left an item at a location previously occupied by the user 202.

The group-inference scenario 318 is a template, a threshold, a range, or a combination thereof for the set of factors for recognizing the intent or the goal of the user 202 relative to other people or entities. The group-inference scenario 318 can include a pattern for the contextual parameters 212 indicative of the user 202 traveling to or from a meeting, traveling similar to, or a combination thereof relative to a person, an entity, or a combination thereof grouped together with the user 202.

For example, the group-inference scenario 318 can include a template, a threshold, a range, or a combination thereof for the contextual parameters 212 for the navigational context 214, the temporal context 230, the communication context 226, the calendar context 224, the user-grouping context 232 of FIG. 2, or a combination thereof. As a more specific example, the return scenario 316 can be for recognizing the user 202 traveling to or from another member of the group, following a similar pattern as another member of the group, taking place of another member of the group, or a combination thereof.

The navigation system 100 can further determine the communication target 236, the target access identification 238, or a combination thereof based on a potential target set 320. The potential target set 320 is one or a grouping of people or entities qualifying as a possible instance of the communication target 236. The navigation system 100 can include one or more candidate targets, each representing a person or an entity qualifying as a possible instance of the communication target 236. The navigation system 100 can generate the potential target set 320 based on the contextual parameters 212.

For example, the potential target set 320 can be generated based on the contextual parameters 212 associated with the navigational context 214, the calendar context 224, the communication context 226, the temporal context 230, the user-grouping context 232, the environmental context 234, or a combination thereof. Also for example, the potential target set 320 can be generated based on the travel history 216, the contact set 228 of FIG. 2 for the user 202, the estimated destination 302, the preceding destination 304, the origination point 306, the specific location set 308, the scenario mechanism 310, or a combination thereof.

The navigation system 100 can further calculate one or more instances of target likelihood 322 for the potential target set 320. The target likelihood 322 is a degree or an amount of confidence associated with the potential target set 320 or the candidate targets therein. The target likelihood 322 can include a value or a rating. The target likelihood 322 can be for representing a probability or a confidence that a corresponding instance of the candidate target of the potential target set 320 is the communication target 236 sought or desired by the user 202. The target likelihood 322 can be calculated based on the contextual parameters 212.

The navigation system 100 can determine the target access identification 238 corresponding to the communication target 236 based on the contact set 228 of FIG. 2 for the user 202. The navigation system 100 can process the target access identification 238 from the contact set 228 when information regarding the communication target 236 is found in the contact set 228.

The navigation system 100 can further determine the target access identification 238 based on a generic data set 324. The generic data set 324 can include sets of information external to a device corresponding to the user 202, such as external to the first device 102 or the second device 106. The generic data set 324 can include information on a device physically remote from the user 202, a general database or a server, internet services or pages, or a combination thereof.

For example, the generic data set 324 can include a contact list for a social networking service, a contact list or an address list for a chatting service or an email provider, or a combination thereof. Also for example, the generic data set 324 can include search database or service, access or links to websites including identification and contact information, advertisement packages or booklets, other identification and contact database, or a combination thereof.

Figure 4:
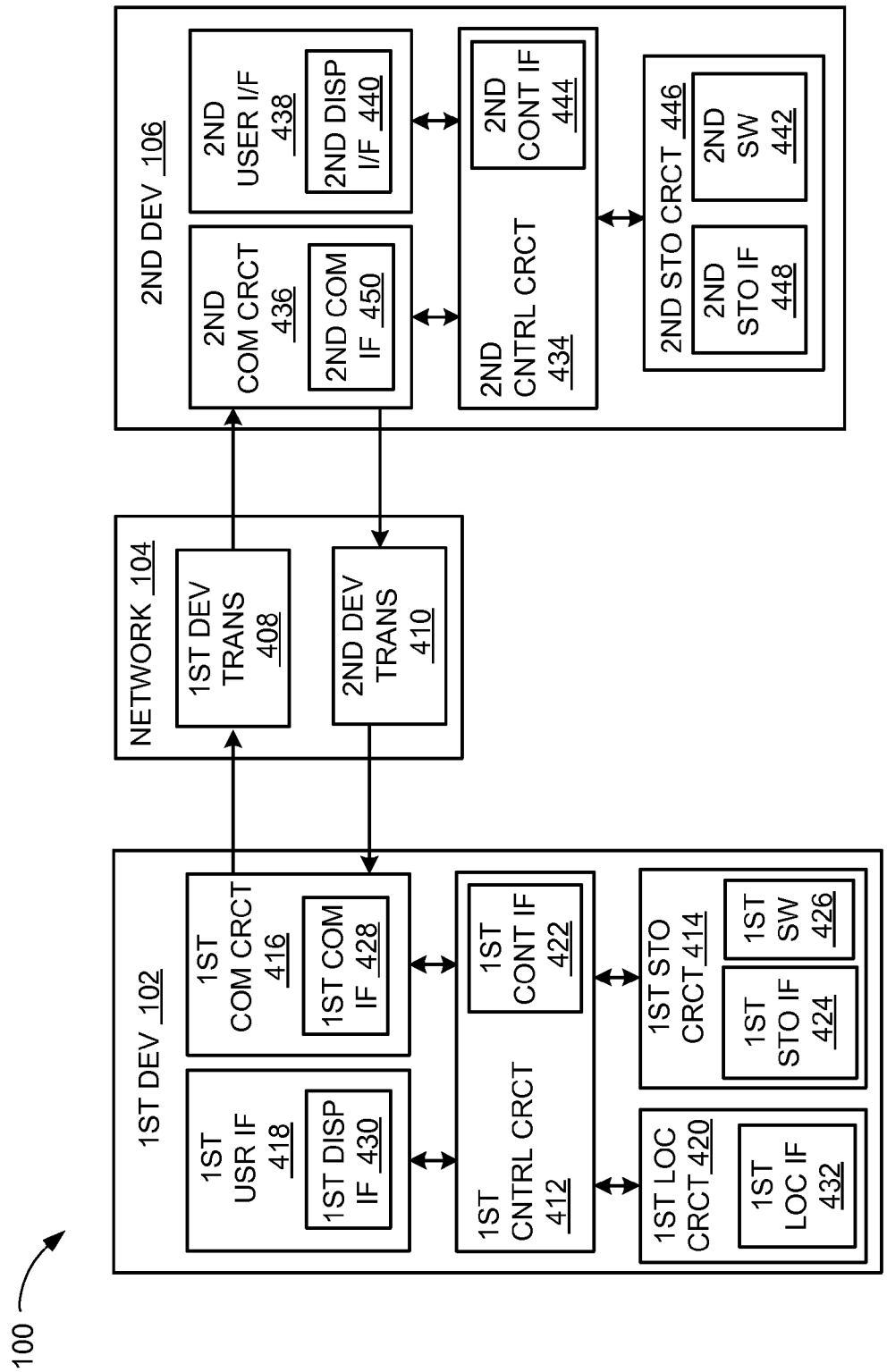
FIG. 4 is an exemplary block diagram of the navigation system.

Referring now to FIG. 4, therein is shown an exemplary block diagram of the navigation system 100. The navigation system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 412, a first storage circuit 414, a first communication circuit 416, and a first user interface 418, and a first location circuit 420. The first control circuit 412 can include a first control interface 422. The first control circuit 412 can execute a first software 426 to provide the intelligence of the navigation system 100.

The first control circuit 412 can be implemented in a number of different manners. For example, the first control circuit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control circuit 412 and other functional units/circuits in the first device 102. The first control interface 422 can also be used for communication that is external to the first device 102.

The first control interface 422 can receive information from the other functional units/circuits or from external sources, or can transmit information to the other functional units/circuits or to external destinations. The external sources and the external destinations refer to sources and destinations external to the first device 102.

The first control interface 422 can be implemented in different ways and can include different implementations depending on which functional units/circuits or external units/circuits are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage circuit 414 can store the first software 426. The first storage circuit 414 can also store the relevant information, such as data representing incoming images, data representing previously presented image, sound files, or a combination thereof.

The first storage circuit 414 can be a volatile memory, a nonvolatile memory, an internal memory, an external memory, or a combination thereof. For example, the first storage circuit 414 can be a nonvolatile storage such as non-volatile random access memory (NVRAM), Flash memory, disk storage, or a volatile storage such as static random access memory (SRAM).

The first storage circuit 414 can include a first storage interface 424. The first storage interface 424 can be used for communication between the first storage circuit 414 and other functional units/circuits in the first device 102. The first storage interface 424 can also be used for communication that is external to the first device 102.

The first storage interface 424 can receive information from the other functional units/circuits or from external sources, or can transmit information to the other functional or to external destinations. The external sources and the external destinations refer to sources and destinations external to the first device 102.

The first storage interface 424 can include different implementations depending on which functional units/circuits or external units/circuits are being interfaced with the first storage circuit 414. The first storage interface 424 can be implemented with technologies and techniques similar to the implementation of the first control interface 422.

The first communication circuit 416 can enable external communication to and from the first device 102. For example, the first communication circuit 416 can permit the first device 102 to communicate with the second device 106 of FIG. 1, an attachment, such as a peripheral device or a desktop computer, and the network 104.

The first communication circuit 416 can also function as a communication hub allowing the first device 102 to function as part of the network 104 and not limited to be an end point or terminal unit or circuit to the network 104. The first communication circuit 416 can include active and passive components, such as microelectronics or an antenna, for interaction with the network 104.

The first communication circuit 416 can include a first communication interface 428. The first communication interface 428 can be used for communication between the first communication circuit 416 and other functional units/circuits in the first device 102. The first communication interface 428 can receive information from the other functional units/circuits or can transmit information to the other functional units/circuits.

The first communication interface 428 can include different implementations depending on which functional units/circuits are being interfaced with the first communication circuit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control circuit 412 can operate the first user interface 418 to display information generated by the navigation system 100. The first control circuit 412 can also execute the first software 426 for the other functions of the navigation system 100, including receiving location information from the first location circuit 420. The first control circuit 412 can further execute the first software 426 for interaction with the network 104 via the first communication circuit 416.

The first location circuit 420 can generate location information, current heading, current acceleration, and current speed of the first device 102, as examples. The first location circuit 420 can be implemented in many ways. For example, the first location circuit 420 can function as at least a part of the global positioning system, an inertial navigation system, a cellular-tower location system, a pressure location system, or any combination thereof. Also, for example, the first location circuit 420 can utilize components such as an accelerometer or global positioning system (GPS) receiver.

The first location circuit 420 can include a first location interface 432. The first location interface 432 can be used for communication between the first location circuit 420 and other functional units/circuits in the first device 102. The first location interface 432 can also be used for communication external to the first device 102.

The first location interface 432 can receive information from the other functional units/circuits or from external sources, or can transmit information to the other functional units/circuits or to external destinations. The external sources and the external destinations refer to sources and destinations external to the first device 102.

The first location interface 432 can include different implementations depending on which functional units/circuits or external units/circuits are being interfaced with the first location circuit 420. The first location interface 432 can be implemented with technologies and techniques similar to the implementation of the first control circuit 412.

The second device 106 can be optimized for implementing an embodiment of the present invention in a multiple device embodiment with the first device 102. The second device 106 can provide the additional or higher performance processing power compared to the first device 102. The second device 106 can include a second control circuit 434, a second communication circuit 436, a second user interface 438, and a second storage circuit 446.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control circuit 434 can execute a second software 442 to provide the intelligence of the second device 106 of the navigation system 100. The second software 442 can operate in conjunction with the first software 426. The second control circuit 434 can provide additional performance compared to the first control circuit 412.

The second control circuit 434 can operate the second user interface 438 to display information. The second control circuit 434 can also execute the second software 442 for the other functions of the navigation system 100, including operating the second communication circuit 436 to communicate with the first device 102 over the network 104.

The second control circuit 434 can be implemented in a number of different manners. For example, the second control circuit 434 can be a processor, an embedded processor, a microprocessor, hardware control logic, a hardware finite state machine (FSM), a digital signal processor (DSP), or a combination thereof.

The second control circuit 434 can include a second control interface 444. The second control interface 444 can be used for communication between the second control circuit 434 and other functional units/circuits in the second device 106. The second control interface 444 can also be used for communication that is external to the second device 106.

The second control interface 444 can receive information from the other functional units/circuits or from external sources, or can transmit information to the other functional units/circuits or to external destinations. The external sources and the external destinations refer to sources and destinations external to the second device 106.

The second control interface 444 can be implemented in different ways and can include different implementations depending on which functional units/circuits or external units/circuits are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage circuit 446 can store the second software 442. The second storage circuit 446 can also store the information such as data representing incoming images, data representing previously presented image, sound files, or a combination thereof. The second storage circuit 446 can be sized to provide the additional storage capacity to supplement the first storage circuit 414.

For illustrative purposes, the second storage circuit 446 is shown as a single element, although it is understood that the second storage circuit 446 can be a distribution of storage elements. Also for illustrative purposes, the navigation system 100 is shown with the second storage circuit 446 as a single hierarchy storage system, although it is understood that the navigation system 100 can have the second storage circuit 446 in a different configuration. For example, the second storage circuit 446 can be formed with different storage technologies forming a memory hierarchal system including different levels of caching, main memory, rotating media, or off-line storage.

The second storage circuit 446 can be a volatile memory, a nonvolatile memory, an internal memory, an external memory, or a combination thereof. For example, the second storage circuit 446 can be a nonvolatile storage such as non-volatile random access memory (NVRAM), Flash memory, disk storage, or a volatile storage such as static random access memory (SRAM).

The second storage circuit 446 can include a second storage interface 448. The second storage interface 448 can be used for communication between the second storage circuit 446 and other functional units/circuits in the second device 106. The second storage interface 448 can also be used for communication that is external to the second device 106.

The second storage interface 448 can receive information from the other functional units/circuits or from external sources, or can transmit information to the other functional units/circuits or to external destinations. The external sources and the external destinations refer to sources and destinations external to the second device 106.

The second storage interface 448 can include different implementations depending on which functional units/circuits or external units/circuits are being interfaced with the second storage circuit 446. The second storage interface 448 can be implemented with technologies and techniques similar to the implementation of the second control interface 444.

The second communication circuit 436 can enable external communication to and from the second device 106. For example, the second communication circuit 436 can permit the second device 106 to communicate with the first device 102 over the network 104.

The second communication circuit 436 can also function as a communication hub allowing the second device 106 to function as part of the network 104 and not limited to be an end point or terminal unit or circuit to the network 104. The second communication circuit 436 can include active and passive components, such as microelectronics or an antenna, for interaction with the network 104.

The second communication circuit 436 can include a second communication interface 450. The second communication interface 450 can be used for communication between the second communication circuit 436 and other functional units/circuits in the second device 106. The second communication interface 450 can receive information from the other functional units/circuits or can transmit information to the other functional units/circuits.

The second communication interface 450 can include different implementations depending on which functional units/circuits are being interfaced with the second communication circuit 436. The second communication interface 450 can be implemented with technologies and techniques similar to the implementation of the second control interface 444.

The first communication circuit 416 can couple with the network 104 to send information to the second device 106 in the first device transmission 408. The second device 106 can receive information in the second communication circuit 436 from the first device transmission 408 of the network 104.

The second communication circuit 436 can couple with the network 104 to send information to the first device 102 in the second device transmission 410. The first device 102 can receive information in the first communication circuit 416 from the second device transmission 410 of the network 104. The navigation system 100 can be executed by the first control circuit 412, the second control circuit 434, or a combination thereof. For illustrative purposes, the second device 106 is shown with the partition having the second user interface 438, the second storage circuit 446, the second control circuit 434, and the second communication circuit 436, although it is understood that the second device 106 can have a different partition. For example, the second software 442 can be partitioned differently such that some or all of its function can be in the second control circuit 434 and the second communication circuit 436. Also, the second device 106 can include other functional units/circuits not shown in FIG. 4 for clarity.

The functional units/circuits in the first device 102 can work individually and independently of the other functional units/circuits. The first device 102 can work individually and independently from the second device 106 and the network 104.

The functional units/circuits in the second device 106 can work individually and independently of the other functional units/circuits. The second device 106 can work individually and independently from the first device 102 and the network 104.

The functional units/circuits described above can be implemented in hardware. For example, one or more of the functional units/circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 5:
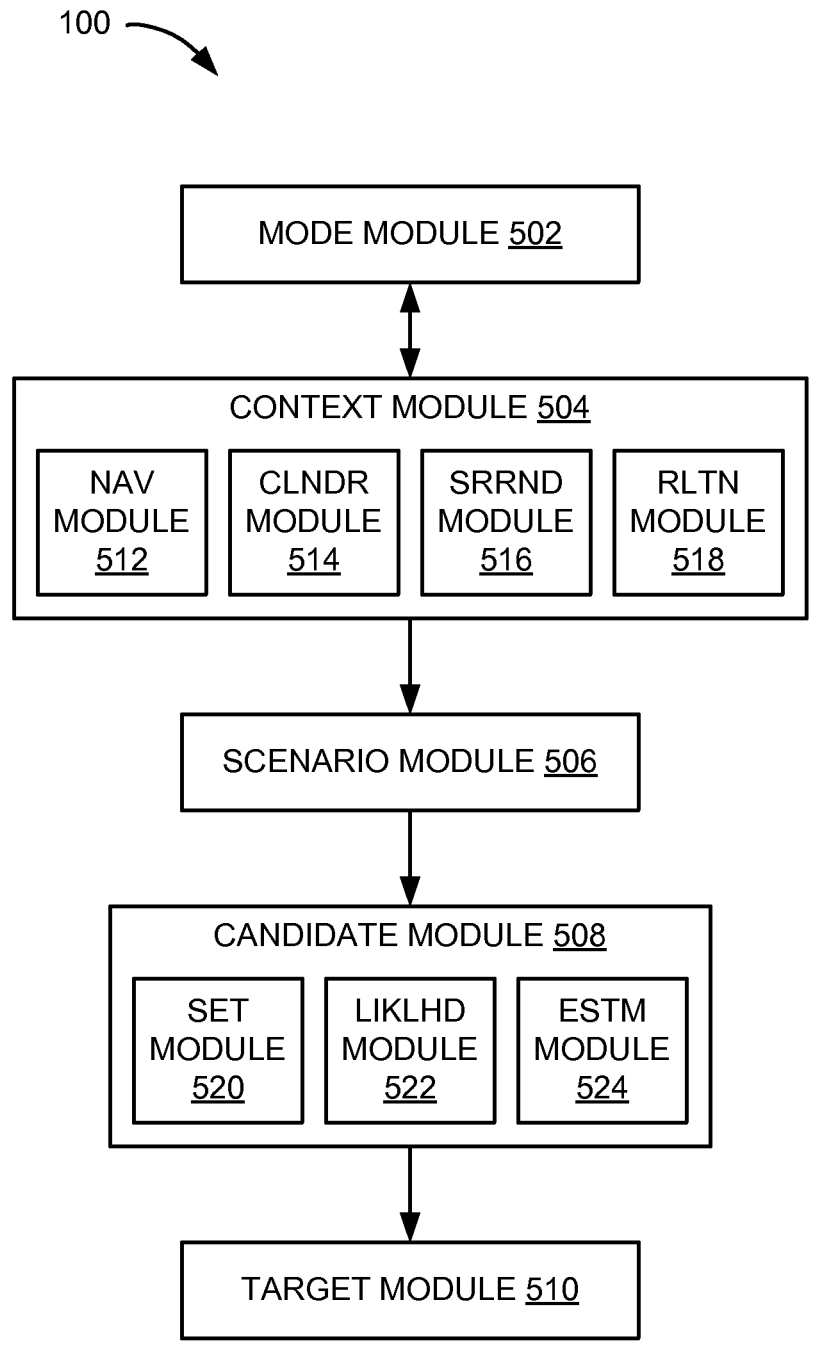
FIG. 5 is a control flow of the navigation system.

Referring now to FIG. 5, therein is shown a control flow of the navigation system 100. The navigation system 100 can include a mode module 502, a context module 504, a scenario module 506, a candidate module 508, a target module 510, or a combination thereof.

The mode module 502 can be coupled to the context module 504. The context module 504 can be coupled to the scenario module 506. The scenario module 506 can be coupled to the candidate module 508. The candidate module 508 can be coupled to the target module 510.

The modules can be coupled using wired or wireless connections, by having an output of one module as an input of the other module, by having operations of one module influence operation of the other module, or a combination thereof. The modules can be directly coupled with no intervening structures or objects other than the connector there-between, or indirectly coupled.

The mode module 502 is configured to determine movement of the user 202 of FIG. 2. The mode module 502 can determine current or previous movement of the user 202 or an aspect thereof. For example, the mode module 502 can identify the free-travel mode 204 of FIG. 2.

The mode module 502 can identify the free-travel mode 204 for representing the user 202 travelling without the calculated navigation route 206 of FIG. 2 or the expressed destination 208 of FIG. 2. The mode module 502 can identify the free-travel mode 204 in a variety of ways.

For example, the mode module 502 can identify the free-travel mode 204 based on movement information of the user 202. The mode module 502 can use GPS information or relevant information, such as position coordinate, heading, speed, acceleration, or a combination thereof for the movement information of the user 202.

Continuing with the example, the mode module 502 can use the movement information of the first device 102 of FIG. 1, the second device 106 of FIG. 1, or a combination thereof. The mode module 502 can further use the movement information from the first location circuit 420 of FIG. 4, the first communication circuit 416 of FIG. 4, the second communication circuit 436 of FIG. 4, or a combination thereof.

Continuing with the example, the mode module 502 can process the movement information for identifying the free-travel mode 204. The mode module 502 can identify the free-travel mode 204 based on comparing the movement information to a threshold predetermined by the navigation system 100 for identifying the free-travel mode 204. As a more specific example, the mode module 502 can identify the free-travel mode 204 for the movement information, such as the coordinate or heading overlapping or corresponding to a vehicle path, speed or acceleration corresponding to a vehicle, or a combination thereof.

Also for example, the mode module 502 can identify the free-travel mode 204 based on recognizing or corresponding with a vehicle. The mode module 502 can identify the free-travel mode 204 when the first device 102, the second device 106, or a combination thereof is within a vehicle or within a predetermined distance from the vehicle.

As a more specific example, the mode module 502 can identify the free-travel mode 204 when the first device 102, the second device 106, or a combination thereof communicates or links with the vehicle or a device embedded therein. Also as a more specific example, the mode module 502 can identify the free-travel mode 204 based on detecting a signal strength from or at the first device 102, the second device 106, the vehicle, or a combination thereof.

Also for example, the mode module 502 can identify the free-travel mode 204 based on interaction with the user 202 or a lack thereof. As a more specific example, the mode module 502 can identify the free-travel mode 204 based on lack or absence of input from the user 202 for the calculated navigation route 206, the expressed destination 208, or a combination thereof. The mode module 502 can identify the free-travel mode 204 based on the movement information in the lack or the absence of input from the user 202 for the calculated navigation route 206, the expressed destination 208, or a combination thereof.

The mode module 502 can determine movement information of the user 202 using the first location circuit 420, the first communication circuit 416, the second communication circuit 436, the first control circuit 412 of FIG. 2, the second control circuit 434 of FIG. 4, or a combination thereof. The mode module 502 can store the movement information in the first storage circuit 414 of FIG. 4, the second storage circuit 446 of FIG. 4, or a combination thereof.

After determining movement of the user 202, the control flow can pass from the mode module 502 to the context module 504. For example, the control flow can pass by having a processing result, such as the free-travel mode 204, the movement information, or a combination thereof as an output from the mode module 502 to an input of the context module 504.

Also for example, the control flow can further pass by storing the processing result at a location known and accessible to the context module 504. Also for example, the control flow can further pass by notifying the context module 504, such as by using a flag, an interrupt, a status signal, or a combination thereof. Also for example, the control flow can further pass using a combination of the processes described above.

The context module 504 is configured to process the contextual parameters 212 of FIG. 2. The context module 504 can process the contextual parameters 212 by determining or recognizing the contextual parameters 212 during, contemporaneous with, or concurrent with the free-travel mode 204.

The context module 504 can determine or recognize the contextual parameters 212 for or according to various contexts, such as the navigational context 214 of FIG. 2, the calendar context 224 of FIG. 2, the communication context 226 of FIG. 2, the temporal context 230 of FIG. 2, the user-grouping context 232 of FIG. 2, the environmental context 234 of FIG. 2, or a combination thereof. For example, the context module 504 can include a navigational module 512, a calendar module 514, a surroundings module 516, a relational module 518, or a combination thereof.

The navigational module 512 is configured to determine the contextual parameters 212 associated with the movement of the user 202. The navigational module 512 can determine the contextual parameters 212 for or associated with the navigational context 214. The navigational module 512 can determine the contextual parameters 212 for the navigational context 214 during the free-travel mode 204 for representing movement of the user 202.

The navigational module 512 can determine the travel session 210 of FIG. 2 for the free-travel mode 204. The navigational module 512 can determine the travel session 210 based on determining the origination point 306 of FIG. 3, the preceding destination 304 of FIG. 3, or a combination thereof.

The navigational module 512 can determine the origination point 306 as a starting location for the travel session 210 for the free-travel mode 204. The navigational module 512 can determine the origination point 306 as the geographic location where the free-travel mode 204 is first identified by the navigation system 100.

The navigational module 512 can further determine the origination point 306 as the geographic location at the beginning of a continuous travel associated with identification of the free-travel mode 204. The navigational module 512 can determine the origination point 306 for representing the user 202 departing from the origination point 306 at a beginning of the free-travel mode 204.

The navigational module 512 can determine the origination point 306 as the geographic location where the free-travel mode 204 is first identified by the mode module 502. The navigational module 512 can determine the origination point 306 can determine the origination point 306 as a location subsequent to arriving at the expressed destination 208, subsequent to arriving at the estimated destination 302 of FIG. 3 for a prior instance of the travel session 210, after a predetermined length of stay or non-vehicular movement at or near a location or an establishment, along with a specific instance of the contextual parameters 212 or a change thereof, or a combination thereof.

The navigational module 512 can further determine the contextual parameters 212 including the movement information for the user 202 occurring in the past, such as the preceding destination 304, the travel history 216 of FIG. 2, or a combination thereof. The navigational module 512 can determine the preceding destination 304 corresponding to a previous instance of the travel session 210.

The navigational module 512 can determine the preceding destination 304 as the expressed destination 208, the estimated destination 302 for a prior instance of the travel session 210, a location with the user 202 staying or occupying over a predetermined threshold duration, or a combination thereof. The navigational module 512 can determine the preceding destination as a location associated with the user 202 preceding the current instance of the origination point 306.

The navigational module 512 can determine the travel history 216. The navigational module 512 can determine the travel history 216 based on recording the location or movement information associated with the user 202. The navigational module 512 can further determine the travel history 216 based on accessing the records of the previous location or movement information associated with the user 202.

The navigational module 512 can determine the travel history 216 based on determining the hover location 218 of FIG. 2. The navigational module 512 can determine a stay, an occupancy, a patronage, a usage, or a combination thereof associated with a location or an establishment. The navigational module 512 can determine the hover location 218 as a location with the user 202 staying over a threshold duration within a threshold boundary or a tolerance area around the location. The navigational module 512 can determine the hover location 218 based on the threshold duration specific to an instance of the contextual parameters 212 associated with the user 202, the location, or a combination thereof.

The navigational module 512 can determine the hover location 218 as the location where the user 202 knows and visits without specifying as the expressed destination 208. The navigational module 512 can store the hover location 218 as part of the travel history 216. The navigational module 512 can determine one or more locations in the travel history 216 as the hover location 218. The navigational module 512 can further store the preceding destination 304 similarly as part of the travel history 216. The navigational module 512 can access the preceding destination 304 using the travel history 216.

The navigational module 512 can further identify the vehicle status 220 of FIG. 2, the current behavior 222 of FIG. 2, or a combination thereof associated with current instance of the travel session 210. The navigational module 512 can identify the vehicle status 220 based on interacting with the first device 102, the second device 106, the vehicle, a component or a device therein, or a combination thereof. The navigational module 512 can use the first communication circuit 416, the second communication circuit 436, communication circuit associated with the device, or a combination thereof to request, send, or receive the vehicle status 220.

The navigational module 512 can further analyze the movement information of the user 202 during the current instance of the travel session 210 to identify the current behavior 222. The navigational module 512 can compare the movement information to one or more templates for the movement information, such as for velocity, acceleration, a pattern thereof, or a combination thereof. The navigational module 512 can identify the current behavior 222 based on comparing the movement information to one or more templates.

The navigational module 512 can further generate the specific location set 308 of FIG. 3. The navigational module 512 can generate the specific location set 308 for representing the specific location set 308 corresponding to the user 202. The navigational module 512 can generate the specific location set 308 based on analyzing patterns of location information of the user 202.

For example, the navigational module 512 can analyze the locations, such as the expressed destination 208, the estimated destination 302, the hover location 218, the travel history 216 or a combination thereof for the user 202. The navigational module 512 can generate the specific location set 308 to include one or more locations or areas frequently visited locations or areas, locations or areas related to a role or a responsibility of the user 202, locations or areas having significance to or affinity of the user 202, locations or areas having efficiency associated with the user 202, or a combination thereof.

As a further example, the navigational module 512 can generate the specific location set 308 to further identify and include a sequence or a pattern between a set of locations applicable to the user 202. Also as a further example, the navigational module 512 can generate the specific location set 308 to further identify and include a pattern between a location and a particular instance of the contextual parameters 212.

The navigational module 512 can use pattern analysis mechanism, machine-learning mechanism, a custom process or mechanism, or a combination thereof predetermined by the navigation system 100 to analyze, determine, and identify the previous locations and patterns of the user 202 in generating the specific location set 308. The navigational module 512 can also perform statistical analysis, temporal analysis, connections or links to particular values or instances of the contextual parameters 212, or a combination thereof to analyze the locations.

The context module 504 can determine the navigational context 214 along with the calendar context 224, the communication context 226, the temporal context 230, the user-grouping context 232, the environmental context 234, or a combination thereof based on the contextual parameter 212. The context module 504 can use the calendar module 514, the surroundings module 516, the relational module 518, or a combination thereof for the calendar context 224, the communication context 226, the temporal context 230, the user-grouping context 232, the environmental context 234, or a combination thereof.

The calendar module 514 is configured to process the contextual parameters 212 associated with time or schedule of the user 202. The calendar module 514 can process, such as identify or determine, the contextual parameters 212 for the calendar context 224. The calendar module 514 can access schedule calendar for the user 202.

The calendar module 514 can search for, identify, access, or a combination of operations thereof for calendar events, such as appointments or meetings, notes, reminders, content associated thereto, time or duration associated thereto, or a combination thereof. The calendar module 514 can process the calendar information of the user 202 stored in the first storage circuit 414, the second storage circuit 446, other storage circuit for other device, or a combination thereof.

The surroundings module 516 is configured to process the contextual parameters 212 associated with physical context of the user 202. The surroundings module 516 can process, such as identify or determine, the contextual parameters 212 for the temporal context 230, the environmental context 234, or a combination thereof.

The surroundings module 516 can identify the current time for the temporal context 230. The surroundings module 516 can compare the current time to various known times, such as a season, a time of day, or other times having contextual significance. For example, the surroundings module 516 can compare the current time to a season, a school calendar, a school day, a traffic time, meal time, work or professional schedule, weekday or weekend, a holiday, or a combination thereof.

The surroundings module 516 can further identify current environmental information. For example, the surroundings module 516 can identify the current weather, the weather forecast, physical conditions or delays associated with roads or travel means, signal strength, noise level, number or identity of co-occupants or passengers, visibility, or a combination thereof. The surroundings module 516 can identify contextual significance of the environmental information based on comparison to threshold or template predetermined by the navigation system 100.

The relational module 518 is configured to process the contextual parameters 212 associated with connection of the user 202 to other people or entities. The relation module 518 can process, such as identify or determine, the contextual parameters 212 for the user-grouping context 232, the communication context 226, or a combination thereof.

The relational module 518 can identify the people or entities connected to the user 202 as the contextual parameters 212 for the user-grouping context 232. The relational module 518 can further identify a nature or a category of relationship between the user 202 and each of the people or entities. The relational module 518 can further identify a significance, a degree, a closeness, or a combination thereof for each of the connections.

For example, the relational module 518 can identify based on accessing the contact set 228 of FIG. 2, social network service for the user 202, profile for the user, a previous communication for the user 202, or a combination thereof. Also for example, the relational module 518 can identify based on usage of keywords, user input, frequency of duration of communication, or a combination thereof.

The relational module 518 can further identify the previous communication for the communication context 226. The relational module 518 can store communication history information for the user 202, including communicating party, time or duration associated thereto, content thereof, contextual information associated thereto, or a combination thereof. The relational module 518 can access the communication history information for the contextual parameters 212 associated with the communication context 226.

The relational module 518 can further compare the current communication or surroundings information to the connection or communication history of the user 202. The relational module 518 can determine a significance or a meaning for the current communication or surroundings information based on comparison to the connection or communication history of the user 202.

The context module 504 can receive or access information for the contextual parameters 212 using the first user interface 418 of FIG. 4, the second user interface 438 of FIG. 4, the first communication circuit 416, the second communication circuit 436, the first storage interface 424 of FIG. 4, the second storage interface 448 of FIG. 4, or a combination thereof. The context module 504 can process the contextual parameters 212 for the various context using the first control circuit 412, the second control circuit 434, or a combination thereof. The context module 504 can store the contextual parameters 212, processing results thereof, or a combination thereof in the first storage circuit 414, the second storage circuit 446, or a combination thereof.

After processing the contextual parameters 212, the control flow can pass from the context module 504 to the scenario module 506. The control flow can pass similarly as described above between the mode module 502 and the context module 504, but using processing results of the context module 504, such as the contextual parameters 212 or processing results thereof.

The scenario module 506 is configured to analyze the contextual parameters 212 for recognizing the current situation, condition, intent, or desire of the user 202. The scenario module 506 can analyze the contextual parameters 212 using the scenario mechanism 310 of FIG. 3. The scenario module 506 can compare the contextual parameters 212 to various instance or groupings of a template, a threshold, a range, or a combination thereof for various scenarios.

For example, the scenario module 506 can compare the contextual parameters 212 during the travel session 210 of the free-travel mode 204 to the vehicle-service scenario 312 of FIG. 3, the route-waypoint scenario 314 of FIG. 3, the return scenario 316 of FIG. 3, the group-inference scenario 318 of FIG. 3, or a combination thereof. As a more specific example, the scenario module 506 can compare the contextual parameters 212 for the current instance of the travel session 210 to templates, patterns, thresholds, or a combination thereof for the vehicle-service scenario 312, the route-waypoint scenario 314, the return scenario 316, the group-inference scenario 318, or a combination thereof.

The scenario module 506 can determine a location, a person, an entity, or a combination thereof as a potential candidate for the communication target 236 of FIG. 2 corresponding to the current situation, condition, intent, or desire of the user 202. The scenario module 506 can determine the potential location, the potential person, the potential entity, or a combination thereof based on analyzing the contextual parameters 212 using the scenario mechanism 310.

The scenario module 506 can determine the potential location, the potential person, the potential entity, or a combination thereof as an output from a scenario matching or describing the contextual parameters 212. For example, the scenario module 506 can determine a mechanic or a location for servicing vehicles as the potential location or destination, the potential person, the potential entity, or a combination thereof sought or desired by the user 202 for the contextual parameters 212 satisfying the vehicle-service scenario 312.

As a more specific example, the scenario module 506 can determine the mechanic or the location for servicing vehicles as potentially desired or sought by the user 202 based on the contextual parameters 212 including the vehicle status 220 representing troubles or issues with the vehicle, unusual or problematic indications in the current behavior 222, or a combination thereof. Also as a more specific example, the scenario module 506 can determine the mechanic or the location for servicing vehicles based on movement information of the user 202, such as the direction or the heading toward the mechanic or the servicing location, change or deviation in a travel pattern of the user 202 relative to the vehicle status 220, or a combination thereof.

Also for example, the scenario module 506 can determine a location or an entity representing or associated with an intermediate intent or goal of the user 202 associated traveling to the estimated destination 302. The scenario module 506 can determine the location or the entity for the contextual parameters 212 satisfying the route-waypoint scenario 314.

As a more specific example, the scenario module 506 can determine a refueling station or a store based on the contextual parameters 212 including a pattern for the contextual parameters 212 indicative of the user 202 wanting to buy items for use or consumptions at the estimated destination 302 or refuel on the way to the estimated destination 302. The scenario module 506 can analyze the current behavior 222, the travel history 216, the vehicle status 220, the contextual parameters 212 for the navigational context 214, such as for movement information, or a combination thereof for the pattern and the route-waypoint scenario 314.

Also as a more specific example, the scenario module 506 can analyze the contextual parameters 212 for the calendar context 224 or the communication context 226, the temporal context 230, or a combination thereof associated with potential needs or stops along the way to the estimated destination 302. The scenario module 506 can compare the reminders or recent communications, a significance or a meaning for the current time, or a combination thereof to the route-waypoint scenario 314.

Also for example, the scenario module 506 can determine a location or an entity previously visited or occupied by the user 202. The scenario module 506 can determine the origination point 306 or the preceding destination 304 for the contextual parameters 212 satisfying the return scenario 316.

As a more specific example, the scenario module 506 can determine the potential intent or desire of the user 202 to return to the origination point 306 or the preceding destination 304 to retrieve a misplaced item. The scenario module 506 can analyze a pattern in comparison to the return scenario 316 for the contextual parameters 212 using the travel history 216, the current behavior 222, the contextual parameters 212 for the navigational context 214 or the calendar context 224, such as for movement information, or a combination thereof.

Also for example, the scenario module 506 can determine a person, an entity, or a combination thereof associated with the intent or the goal of the user 202. The scenario module 506 can determine the person, the entity, or a combination thereof associated or linked with the user 202 through an activity, the current instance of the travel session 210, or a combination thereof.

As a more specific example, the scenario module 506 can determine the person, the entity, or a combination thereof belonging to a grouping with the user 202 using the contextual parameters 212 for the calendar context 224, the communication context 226, the temporal context 230, the user-grouping context 232, or a combination thereof. Also as a more specific example, the scenario module 506 can determine the contextual parameters 212 for the navigational context 214 associated with the user 202 traveling to or from such grouping for the contextual parameters 212 satisfying the route-waypoint scenario. Also as a more specific example, the scenario module 506 can determine the contextual parameters 212 for the navigational context 214 associated with the user 202 following a similar pattern of travel as another member of the group, taking place of another member of the group, or a combination thereof.

The scenario module 506 can analyze the contextual parameters 212 for the various context using the first control circuit 412, the second control circuit 434, or a combination thereof. The scenario module 506 can store the potential location, the potential person, the potential entity, or a combination thereof in the first storage circuit 414, the second storage circuit 446, or a combination thereof.

After recognizing the current situation, condition, intent, or desire of the user 202, the control flow can pass from the scenario module 506 to the candidate module 508. The control flow can pass similarly as described above between the mode module 502 and the context module 504, but using processing results of the scenario module 506, such as the potential location, the potential person, the potential entity, or a combination thereof.

The candidate module 508 is configured to analyze potential communication counterparts relevant to the user 202. The candidate module 508 can analyze processing results of the context module 504, the scenario module 506, or a combination thereof to analyze the potential communication counterparts relevant or applicable to the user 202. The candidate module 508 can analyze the potential communication counterparts relevant or applicable to the user 202 during or for the current instance of the travel session 210 for the free-travel mode 204.

The candidate module 508 can analyze potential communication counterparts based on generating the potential target set 320 of FIG. 3, calculating the target likelihood values 322 of FIG. 3 for the potential target set 320, generating the estimated destination 302, or a combination thereof. The candidate module 508 can include a set module 520, a likelihood module 522, an estimation module 524, or a combination thereof for analyzing potential communication counterparts during the free-travel mode 204.

The set module 520 is configured to generate the potential target set 320. The set module 520 can generate the potential target set 320 including one or more people, entities, organizations, establishments, or a combination thereof with the user 202 may wish to designated as a counterpart for communication. The set module 520 can generate the potential target set 320 including the one or more people, entities, organizations, establishments, or a combination thereof estimated to be or with potential to become the communication target 236 for the user 202 during or for the current instance of the travel session 210 of the free-travel mode 204.

The set module 520 can generate the potential target set 320 based on the travel history 216, the preceding destination 304, the origination point 306, the specific location set 308, the contact set 228, or a combination thereof. The set module 520 can generate the potential target set 320 identifying or including one or more people, entity, location, establishment, group, or a combination thereof represented in the travel history 216, the preceding destination 304, the origination point 306, the specific location set 308, the contact set 228, or a combination thereof.

The set module 520 can further generate the potential target set 320 identifying or including one or more people, entity, location, establishment, group, or a combination thereof resulting from processing of the scenario module 506, including the potential location, the potential person, the potential entity, or a combination thereof. The set module 520 can identify or include for generating the potential target set 320 based on the contextual parameters 212.

For example, the set module 520 can generate the potential target set 320 based on the contextual parameters 212 associated with the current instance of the travel session 210. Also for example, the set module 520 can generate the potential target set 320 based on the contextual parameters 212 associated with the navigational context 214, the calendar context 224, the communication context 226, the temporal context 230, the user-grouping context 232, the environmental context 234, a particular label or determination associated thereto, or a combination thereof.

The set module 520 can identify or include for generating the potential target set 320 according to a statistical analysis, such as most frequently or last utilized, a highest relevance or match to a set of key words or a model, a pattern, or a combination thereof for the contextual parameters 212. The set module 520 can include a model, a cluster, a pattern template, a threshold, a range, a method or a pattern associated thereto, a machine-learning mechanism, or a combination thereof predetermined by the navigation in generating the potential target set 320.

For example, the set module 520 can select one or more of the travel history 216, the preceding destination 304, the origination point 306, the specific location set 308, or the contact set 228 to include in the potential target set 320 based on the contextual parameters 212. The set module 520 can utilize predetermined set patterns or values of the contextual parameters 212 dictating selection of the one or more of the travel history 216, the preceding destination 304, the origination point 306, the specific location set 308, or the contact set 228.

Also for example, the set module 520 can select one or more entries or components in the travel history 216, the preceding destination 304, the origination point 306, the specific location set 308, or the contact set 228 to include in the potential target set 320 based on the contextual parameters 212. Also for example, the set module 520 can combine, order, sequence, or a combination of operations thereof for the entries or components in the travel history 216, the preceding destination 304, the origination point 306, the specific location set 308, the contact set 228, or a combination thereof to generate the potential target set 320.

The likelihood module 522 is configured to calculate the target likelihood 322 for the potential target set 320. The likelihood module 522 can calculate the target likelihood 322 corresponding to one or more instance of the entries within the potential target set 320. The likelihood module 522 can calculate the target likelihood 322 for each of the people, entity, location, establishment, group, or a combination thereof included in the potential target set 320.

The likelihood module 522 can calculate the target likelihood 322 based on the contextual parameters 212. The likelihood module 522 can calculate the target likelihood 322 based on the contextual parameters 212 associated with the current instance of the travel session 210. The likelihood module 522 can calculate the target likelihood 322 for representing the likelihood, a confidence level, or a probability for corresponding entry in the potential target set 320 being the communication target 236, given the current condition or situation represented by the contextual parameters 212.

The likelihood module 522 can calculate the target likelihood 322 based on the contextual parameters 212 associated with the navigational context 214, the calendar context 224, the communication context 226, the temporal context 230, the user-grouping context 232, the environmental context 234, a particular label or determination associated thereto, or a combination thereof. The likelihood module 522 can calculate the target likelihood 322 according to a value or a weight associated with the contextual parameters 212, the corresponding entry in the potential target set 320, or a combination thereof.

For example, the likelihood module 522 can calculate the target likelihood 322 according a predetermined set of values or weights assigned to various possible instances of the contextual parameters 212, the possible entries or possible categories of the entries in the potential target set 320, or a combination thereof. Also for example, the likelihood module 522 can calculate the target likelihood 322 according to a model, a cluster, a strength of association thereof corresponding to the contextual parameters 212, the corresponding entry in the potential target set 320, or a combination thereof.

The estimation module 524 is configured to generate the estimated destination 302 in analyzing potential communication counterparts relevant to the user 202. The estimation module 524 can generate the estimated destination 302 for the free-travel mode 204.

The estimation module 524 can generate the estimated destination 302 based on the potential target set 320, the target likelihood 322, or a combination thereof. The estimation module 524 can further generate the estimated destination 302 for inclusion in the potential target set 320. The estimation module 524 can generate the estimated destination 302, the set module 520 can add the estimated destination 302 into the potential target set 320, and the likelihood module 522 can calculated the target likelihood 322 for the estimated destination 302 as described above.

The estimation module 524 can generate the estimated destination 302 based on comparing the contextual parameters 212 for the navigational context 214 with the contextual parameters 212 the calendar context 224, the communication context 226, the temporal context 230, the user-grouping context 232, the environmental context 234, or a combination thereof. The estimation module 524 can generate the estimated destination 302 based on determined value or category of the navigational context 214 with determined value or category of the contextual parameters 212 the calendar context 224, the communication context 226, the temporal context 230, the user-grouping context 232, the environmental context 234, or a combination thereof according to the contextual parameters 212 for the free-travel mode 204.

For example, the estimation module 524 can generate the estimated destination 302 as a person, a location, an entity, an establishment, or a combination thereof located along or around a direction, a road, or a combination thereof currently traveled by the user 202. The estimation module 524 can generate the estimated destination 302 as the person, the location, the entity, the establishment, or a combination thereof represented in the travel history 216, the preceding destination 304, the origination point 306, the specific location set 308, the contact set 228, or a combination thereof and geographically located along or around a direction, a road, or a combination thereof currently traveled by the user 202.

As a more specific example, the estimation module 524 can generate the estimated destination 302 from within the specific location set 308, the potential target set 320, or a combination thereof. Also as a more specific example, the estimation module 524 can generate the estimated destination 302 as the preceding destination 304 or the origination point 306.

The estimation module 524 can further generate the estimated destination 302 as the person, the location, the entity, the establishment, or a combination thereof matching or relevant to the contextual parameters 212 for the current instance of the travel session 210 as exemplified above, such as using predetermined patterns, associations, machine-learning mechanism, pattern matching mechanism, or a combination thereof. The estimation module 524 can generate the estimated destination 302 as the person, the location, the entity, the establishment, or a combination thereof within the potential target set 320 corresponding to maximum instance or highest value of the target likelihood 322.

For example, the estimation module 524 can generate the estimated destination 302 as the person, the location, the entity, the establishment, or a combination thereof located along the direction of travel or related to previous destination passed by the travel of the user 202. The estimation module 524 can generate the estimated destination 302 by narrowing the list of the person, the location, the entity, the establishment, or a combination thereof according to the contextual relevance to the current travel of the user 202.

The candidate module 508 can readjust or regenerate the potential target set 320 to include the potential location, the potential person, the potential entity, or a combination thereof from utilizing the scenario mechanism 310. The candidate module 508 can further readjust or regenerate the potential target set 320 to include estimated destination 302. The candidate module 508 can further utilize the likelihood module 522 to calculate the target likelihood 322 associated thereto.

The candidate module 508 can analyze the potential communication counterparts using the first control circuit 412, the second control circuit 434, or a combination thereof. The candidate module 508 can store the processing results, including the potential target set 320, the target likelihood 322, the estimated destination 302, or a combination thereof in the first storage circuit 414, the second storage circuit 446, or a combination thereof.

After analyzing the potential communication counterparts applicable to the user 202 during the current instance of the travel session 210 of the free-travel mode 204, the control flow can pass from the candidate module 508 to the target module 510. The control flow can pass similarly as described above between the mode module 502 and the context module 504, but using processing results of the candidate module 508, such as the potential target set 320, the target likelihood 322, the estimated destination 302, or a combination thereof.

The target module 510 is configured to determine the target access identification 238 of FIG. 2 for communicating with the communication target 236 during the free-travel mode 204. The target module 510 can determine the target access identification 238 without the user-entry 240 of FIG. 2 for identifying the target access identification 238, the communication target 236, a portion therein, or a combination thereof. The target module 510 can determine the target access identification 238 based on identifying the communication target 236.

The target module 510 can identify the communication target 236 based on the potential target set 320, the target likelihood 322, the estimated destination 302, or a combination thereof. The target module 510 can identify the communication target 236 using the potential target set 320 based on or including various parameters discussed above. For example, the target module 510 can identify the communication target 236 as the estimated destination 302, the preceding destination 304, the origination point 306, or a combination thereof.

Also for example, the target module 510 can identify the communication target 236 as the person, the location, the entity, the establishment, or a combination thereof represented by the contact set 228, the travel history 216, the potential target set 320, or a combination thereof. Also for example, the target module 510 can identify the communication target 236 as the potential location, the potential person, the potential entity, or a combination thereof from utilizing the scenario mechanism 310.

The target module 510 can identify the communication target 236 as the person, the location, the entity, the establishment, or a combination thereof included in the potential target set 320 corresponding to the highest value or instance of the target likelihood 322. The target module 510 can determine the target access identification 238 corresponding to the communication target 236 for communicating with the communication target 236. The user 202 can utilize the target access identification 238 to communicate with the communication target 236.

As exemplified above, the target module 510 can determine the target access identification 238 corresponding to the estimated destination 302. The target module 510 can similarly determine the target access identification 238 from the potential target set 320 based on the target likelihood values 322. The target module 510 can similarly determine the target access identification 238 based on the contextual parameter 212 associated with the navigational context 214, the origination point 306, or a combination thereof.

The target module 510 can determine the target access identification 238 based on the contact set 228. The target module 510 can search the contact set 228 for the communication target 236, information or listing corresponding thereto, or a combination thereof. The target module 510 can determine the target access identification 238 as the contact or access information associated with the communication target 236 according to the contact set 228.

The target module 510 can determine the target access identification 238 based on selecting the contact or access information associated with the communication target 236. The target module 510 can determine the target access identification 238 from various contact or access information associated with the communication target 236 based on the contextual parameters 212.

For example, the target module 510 can select an email address over phone-related contacts when the contextual parameters 212 indicate important function or meeting for the communication target 236 as indicated by the contextual parameters 212. Also for example, the target module 510 can select voice-based immediate contacts, such as voice call through a mobile phone, when the user 202 is heading toward the communication target 236, when the user 202 has urgency associated with contacting the communication target 236, or a combination thereof as indicated by the contextual parameters 212.

The target module 510 can also determine the target access identification 238 without utilizing the contact set 228. The target module 510 can determine the target access identification 238 based on the generic data set 324 of FIG. 3. For example, the target module 510 can search the generic data set 324, such as webpages over the internet, a contact list of the user 202 for a social networking service, a contact list or an address list for a chatting service or an email provider for the user 202, advertisement packages or booklets, or a combination thereof, for the communication target 236.

The target module 510 can analyze the accessed information to identify the contact or access information associated with the communication target 236. The target module 510 can determine the target access identification 238 as the identified contact or access information associated with the communication target 236.

The target module 510 can further identify the communication target 236 intended for a search function. The target module 510 can determine the target access identification 238 as the physical, geographical, logical, categorical, or a combination thereof for search zone or boundary associated with the search function. The target module 510 can further determine the target access identification 238 to include the search string.

The target module 510 can further process the target access identification 238. For example, the target module 510 can communicate the target access identification 238 between devices, such as between the first device 102, the second device 106, or a combination thereof. Also for example, the target module 510 can communicate the target access identification 238 to the user 202.

Also for example, the target module 510 can implement or initiate communication with the communication target 236 using the target access identification 238. As a more specific example, the target module 510 can dial the phone number corresponding to the target access identification 238, open a messaging application and complete the recipient address with the address corresponding to the target access identification 238, set the boundaries or zones for search functions, or a combination thereof corresponding to the target access identification 238.

The navigation system 100 can use the target access identification 238 for the free-travel mode 204 determined based on the contextual parameters 212 and without the user-entry 240 for identifying the target access identification 238, the communication target 236, a portion therein, or a combination thereof for predicting the user behavior or intent during operation of a vehicle. The navigation system 100 can determine the target access identification 238 for various functions and user-scenarios.

For example, the user 202 heading to a hotel on a vacation may want to call a destination before the user 202 reaches the destination. The navigation system 100 can use the contextual parameters 212 for the navigational context 214, the communication context 226, such as an email confirmation of a receipt or a text message, the calendar context 224, such as an entry regarding vacation or an itinerary, the temporal context 230, or a combination thereof to determine the destination, such as the hotel, a restaurant, a rental office, or a combination thereof. The navigation system 100 can further utilize the contact set 228 or the generic data set 324 to provide the target access identification 238 for the destination associated with the current context of the user 202 during the scheduled vacation.

Also for example, the user 202 picking up a child from school or daycare may wish to call the entity or location to update them about the arrival time of the user 202. The navigation system 100 can use the contextual parameters 212 for the navigational context 214, the communication context 226, the temporal context 230, or a combination thereof to determine the destination as the school or the daycare specific to the user 202 and the current context.

Also for example, the user 202 requesting a search for a point of interest (POI) during the free-travel mode 204 can specify a generic search term, such as "school", "theater", "bank", "food", or a combination thereof without a specific name for the POI. The navigation system 100 can use the contextual parameters 212 as described above, in addition to or without using user preference, to determine the communication target 236 and the target access identification 238 relevant to the user 202 and the current context.

Also for example, the navigation system 100 can use the communication target 236 and the target access identification 238 to determine the routine of the user 202, such as work related commutes or child-related schedule. The navigation system 100 can determine the communication target 236 and the target access identification 238 using the contextual parameters 212 to provide communication function to the user 202 with minimal interaction and natural speech.

As a more specific example, the user 202 can run an internet search to find out if the known or routine destination will still be open when the user 202 is estimated to arrive. The navigation system 100 can use the communication target 236 based on the estimated destination 302 and the corresponding instance of the target access identification 238 to perform the internet search.

Also as a more specific example, while in transit to a meeting, the user 202 can communicate, such as email or text, to a participant for the meeting. The navigation system 100 can determine the communication target 236 using the contextual parameters 212 as discussed above to determine the participant of the meeting. The navigation system 100 can initiate communication with the meeting participant or automatically communicate the estimated time of arrival (ETA) for the user 202 to the meeting participant using the target access identification 238 corresponding to the communication target 236.

Also as a more specific example, the navigation system 100 can determine the estimated destination 302 or a waypoint as a known or often visited store or service provider. The navigation system 100 can recognize the estimated destination 302 using the contextual parameters 212 as described above and initiate a communication, or communicate an order or a reservation. The navigation system 100 can communicate based on the ETA for the user 202, such as timing the communication based on the ETA or including the ETA in the communication. The navigation system 100 can use the target access identification 238 corresponding to the communication target 236 for the estimated destination 302 to order ahead or reserve appointments to match the ETA of the user 202 at the estimated destination 302.

It has been discovered that the target access identification 238 for the free-travel mode 204 based on the contextual parameters 212 provides increased usability and accessibility of the navigation system 100. The target access identification 238 based on the contextual parameters 212 can provide increase in recognition of natural language or speech pattern. The target access identification 238 for the free-travel mode 204 based on the contextual parameters 212 can be used to identify the communication target 236 relevant to the current situation or condition of the user 202 without the user 202 providing exact search terms. The contextual parameters 212 can be used to determine the target access identification 238 based on generic search terms from the user 202, such as when communicating with another person aware of the current context.

It has been discovered that the target access identification 238 for the free-travel mode 204 determined without or with minimal user-entry 240 for identifying the target access identification 238, the communication target 236, a portion therein, or a combination thereof provides increased safety for the user 202. The target access identification 238 can be determined based on the contextual parameters 212 to reduce or eliminate the user-entry 240 specifying the target access identification 238, the communication target 236, a portion therein, or a combination thereof. The predictive determination of the communication target 236 can reduce the interaction or the specificity required from the user 202 in accessing a function. The reduction in the required interaction can allow the user 202 to keep the focus on operating the vehicle, thereby reducing possibilities for an accident and fulfilling legal requirements for operating the vehicle.

It has been discovered that the target access identification 238 corresponding to the communication target 236 determined based on the estimated destination 302 provides increased efficiency. The navigation system 100 can predict the destination of the user 202 during the free-travel mode 204. The navigation system 100 can determine the target access identification 238 for quickly and naturally providing access to communication functions for the user 202. The navigation system 100 can further communicate the ETA or time the communication based on the ETA to reduce wait times and delays for the user 202 to promote efficiency for the user 202 as well as the estimated destination 302.

It has been discovered that the target access identification 238 determined from the potential target set 320 based on the target likelihood values 322 provides broader access to information for the user 202. The potential target set 320 and the target likelihood 322 can be used to evaluate possibilities or levels of detail, such as specific departments within an organization or a direct line, unknown or inaccessible to the user 202. The navigation system 100 can evaluate a broader set of possibilities for potential contacts, and determine the communication target 236 and the target access identification 238 best fitting the condition or situation of the user 202.

It has been discovered that the target access identification 238 determined based on comparing the contextual parameters 212 associated with the navigational context 214 to other contexts during the free-travel mode 204 provides increased accuracy in estimating the intent or desire of the user 202. The comparison based on the navigational context 214 and other contexts can use current movement, location, and physical behavior of the user 202 to estimate and verify the intent or desire of the user 202. Further, it has been discovered that the comparison based on the navigational context 214 and other contexts can provide reduction in the user's burden required to provide exact terms to access functionalities of the navigation system 100.

It has been discovered that the target access identification 238 based on the scenario mechanism 310 processing the user-grouping context 232, the environmental context 234, the vehicle status 220, the origination point 306, the communication context 226, or a combination thereof provides reduction in resources required for functionalities. The various common scenarios can be represented with the scenario mechanism 310 processing different categories of context. The recognition and uses of common scenarios can reduce the calculations and processes required to determine the target access identification 238. The estimation and recognition of the user's desire or intent using context can further reduce the number of intermediate or auxiliary tasks, such as searching for the exact search terms before performing the actual search or communication.

It has been discovered that the target access identification 238 determined based on the specific location set 308 corresponding to the user 202 provides customization for the user 202 and increased accuracy for specific users. The specific location set 308 based on or in addition to the contextual parameters 212 can represent a preference or a pattern specific to each user, without the expressed configuration or description of the user's preference or pattern. The navigation system 100 can determine the preference or the pattern of the user 202 based on observing the behavior of the user 202 and can further use the preference or the pattern to predict or estimate the intent or the goal of the user 202 for accessing functionalities of the navigation system 100.

The modules described in this application can be hardware implementation or hardware accelerators, including passive circuitry, active circuitry, or both, in the first storage circuit 414, the second storage circuit 446, the first control circuit 412, the second control circuit 434, or a combination thereof. The modules can also be hardware implementation or hardware accelerators, including passive circuitry, active circuitry, or both, within the first device 102, the second device 106, or a combination thereof but outside of the first storage circuit 414, the second storage circuit 446, the first control circuit 412, the second control circuit 434, or a combination thereof.

The navigation system 100 has been described with module functions or order as an example. The navigation system 100 can partition the modules differently or order the modules differently. For example, the scenario module 506 and the candidate module 508 can be combined. Also for example, the mode module 502 can be executed in parallel or simultaneously with the context module 504. Also for example, the estimation module 524 can be implemented as a separate module preceding the candidate module 508 instead of a sub-module of the candidate module 508.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units/circuits.

The modules described in this application can be stored in the non-transitory computer readable medium. The first storage circuit 414, the second storage circuit 446, or a combination thereof can represent the non-transitory computer readable medium. The first storage circuit 414, the second storage circuit 446, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the communication target 236 and the contextual parameters 212 results in the movement in the physical world, such as content displayed or recreated for the user on one or more of the devices or physical displacement of the user 202 carrying the first device 102. Movement in the physical world results in updates to the behavior of the user 204, which can be fed back into the navigation system 100 and further influence or update the communication target 236 and the contextual parameters 212.

Figure 6:
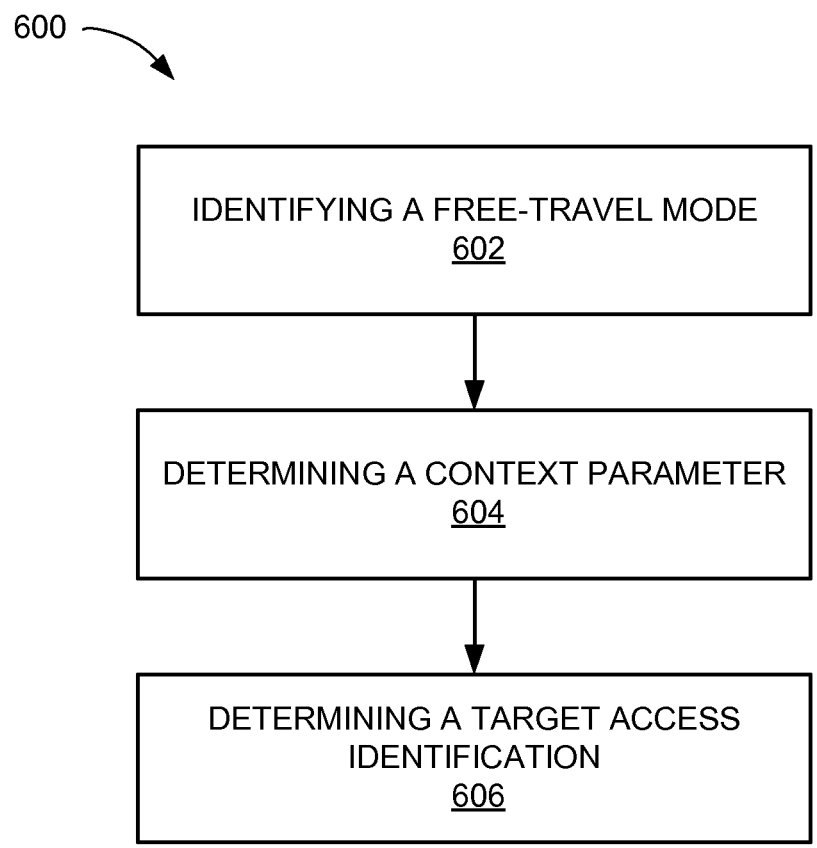
FIG. 6 is a flow chart of a method of operation of a navigation system in an embodiment of the present invention.

Referring now to FIG. 6, therein is shown a flow chart of a method 600 of operation of a navigation system 100 in an embodiment of the present invention. The method 600 includes: identifying a free-travel mode for representing a user travelling without a calculated navigation route or an expressed destination in a block 602; determining a contextual parameter during the free-travel mode in a block 604; and determining a target access identification with a control circuit for communicating with a communication target during the free-travel mode in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:
1. A method of operation of a navigation system comprising:
identifying a free-travel mode, with a mode module, for representing a user travelling without a calculated navigation route or an expressed destination;
determining a contextual parameter including data or information associated with the travel of the user during the free-travel mode, with a context module, for representing an aspect of a current circumstance or a situation of the user, wherein determining the contextual parameter includes determining the contextual parameter associated with a user-grouping context representing a social relationship between the user and other people;
determining a navigational context based on the contextual parameter, with the context module, for representing a purpose or a goal associated with the travel of the user;
determining a target access identification based on the contextual parameter associated with the navigational context, with a target module, for predicting the user behavior or intent during the operation of a vehicle, and for communicating with a communication target during the free-travel mode without a user-entry for identifying the target access identification, the communication target, a portion therein, or a combination thereof based on the predicted user behavior or intent; and
communicating information with the communication target using the target access identification.
2. The method as claimed in claim 1 further comprising:
generating an estimated destination for the free-travel mode; and
wherein:
determining the target access identification includes determining the target access identification corresponding to the estimated destination for communicating with the estimated destination.
3. The method as claimed in claim 1 further comprising:
generating a potential target set based on the contextual parameter;
calculating target likelihood values for the potential target set; and
wherein:
determining the target access identification includes determining the target access identification from the potential target set based on the target likelihood values.
4. The method as claimed in claim 1 further comprising:
determining an origination point for the free-travel mode for representing the user departing from the origination point at a beginning of the free-travel mode; and
wherein:
determining the target access identification includes determining the target access identification based on the origination point for communicating with an estimated destination.
5. The method as claimed in claim 1 further comprising:
determining the navigational context along with a calendar context, a communication context, a temporal context, a user-grouping context, an environmental context, or a combination thereof based on the contextual parameter;
generating an estimated destination for the free-travel mode based on comparing the navigational context with the calendar context, the communication context, the temporal context, the user-grouping context, the environmental context, or a combination thereof; and
wherein:

determining the target access identification includes determining the target access identification corresponding to the estimated destination for communicating with the estimated destination.

6. The method as claimed in claim 5 further comprising:
generating a specific location set for representing the specific location set corresponding to the user; and
wherein:
generating the estimated destination includes generating the estimated destination from within the specific location set.

7. The method as claimed in claim 5 wherein generating the estimated destination includes:
generating a potential target set based on the contextual parameter;
calculating target likelihood values for the potential target set; and
generating the estimated destination from within the potential target set, the estimated destination corresponding to maximum instance of the target likelihood values.

8. The method as claimed in claim 5 wherein generating the estimated destination includes:
determining a preceding destination corresponding to a previous instance of a travel session; and
generating the estimated destination for a current instance of the travel session based on the preceding destination.

9. The method as claimed in claim 5 wherein determining the target access identification includes determining the target access identification based on a generic data set including information on a device physically removed from the user, a general database or a server, internet services or pages, or a combination thereof.

10. A navigation system comprising:
a control circuit configured to:
identify a free-travel mode for representing a user travelling without a calculated navigation route or an expressed destination;
determine a contextual parameter including data or information associated with the travel of the user during the free-travel mode for representing an aspect of a current circumstance or a situation of the user, wherein determining the contextual parameter includes determining the contextual parameter associated with a user-grouping context representing a social relationship between the user and other people;
determine a navigational context based on the contextual parameter for representing a purpose or a goal associated with the travel of the user;
determine a target access identification based on the contextual parameter associated with the navigational context for predicting the user behavior or intent during the operation of a vehicle, and for communicating with a communication target during the free-travel mode without a user-entry for identifying the target access identification, the communication target, a portion therein, or a combination thereof based on the predicted user behavior or intent;
a communication circuit, coupled to the control circuit, configured to:
process the target access identification for communicating with the communication target; and
communicate information with the communication target using the target access identification.

11. The system as claimed in claim 10 wherein the control circuit is configured to:
generate an estimated destination for the free-travel mode; and
determine the target access identification corresponding to the estimated destination for communicating with the estimated destination.

12. The system as claimed in claim 10 wherein the control circuit is configured to:
generate a potential target set based on the contextual parameter;
calculate target likelihood values for the potential target set; and
determine the target access identification from the potential target set based on the target likelihood values.

13. The system as claimed in claim 10 wherein the control circuit is configured to:
determine an origination point for the free-travel mode for representing the user departing from the origination point at a beginning of the free-travel mode; and
determine the target access identification based on the origination point for communicating with the estimated destination.

14. A non-transitory computer readable medium including instructions for a navigation system comprising:
identifying a free-travel mode for representing a user travelling without a calculated navigation route or an expressed destination;
determining a contextual parameter including data or information associated with the travel of the user during the free-travel mode for representing an aspect of a current circumstance or a situation of the user, wherein determining the contextual parameter includes determining the contextual parameter associated with a user-grouping context representing a social relationship between the user and other people;
determining a navigational context based on the contextual parameter for representing a purpose or a goal associated with the travel of the user;
determining a target access identification based on the contextual parameter associated with the navigational context for predicting the user behavior or intent during the operation of a vehicle, and for communicating with a communication target during the free-travel mode without a user-entry for identifying the target access identification, the communication target, a portion therein, or a combination thereof based on the predicted user behavior or intent; and
communicating information with the communication target using the target access identification.

15. The non-transitory computer readable medium as claimed in claim 14 further comprising:
generating an estimated destination for the free-travel mode; and
wherein:
determining the target access identification includes determining the target access identification corresponding to the estimated destination for communicating with the estimated destination.

16. The non-transitory computer readable medium as claimed in claim 14 further comprising:
generating a potential target set based on the contextual parameter;
calculating target likelihood values for the potential target set; and
wherein:

determining the target access identification includes determining the target access identification from the potential target set based on the target likelihood values.

17. The non-transitory computer readable medium as claimed in claim 14 further comprising:

determining an origination point for the free-travel mode for representing the user departing from the origination point at a beginning of the free-travel mode; and wherein:

determining the target access identification includes determining the target access identification based on the origination point for communicating with an estimated destination.

\* \* \* \* \*